United States Patent
Nodenot et al.

(10) Patent No.: US 11,139,949 B2
(45) Date of Patent: Oct. 5, 2021

(54) EQUALIZER ADAPTATION BASED ON EYE MONITOR MEASUREMENTS

(71) Applicant: MACOM Technology Solutions Holdings, inc., Lowell, MA (US)

(72) Inventors: Nicolas Alain Paul Nodenot, La Colle sur Loup (FR); Yohan Denis Lilian Piccin, Mouans-Sartoux (FR)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/021,983

(22) Filed: Sep. 15, 2020

(65) Prior Publication Data

US 2021/0091921 A1   Mar. 25, 2021

(30) Foreign Application Priority Data

Sep. 23, 2019   (FR) ...................................... 1910460

(51) Int. Cl.
*H04L 7/00*   (2006.01)
*H04L 25/03*   (2006.01)

(52) U.S. Cl.
CPC .......... *H04L 7/0025* (2013.01); *H04L 7/0087* (2013.01); *H04L 25/03012* (2013.01)

(58) Field of Classification Search
CPC .................. H04L 7/0025; H04L 7/0087; H04L 25/03012; H04L 27/01; H04B 10/69; H04J 2203/0076
See application file for complete search history.

(56) References Cited

U.S. PATENT DOCUMENTS

| | | |
|---|---|---|
| 5,019,769 A | 5/1991 | Levinson |
| 5,383,208 A | 1/1995 | Queniat et al. |

(Continued)

FOREIGN PATENT DOCUMENTS

| | | |
|---|---|---|
| EP | 3500867 | 6/1919 |
| KR | 101684801 | 12/1916 |

(Continued)

OTHER PUBLICATIONS

French National Institute of Industrial Property ("INPI") Preliminary Report issued for Application No. FR1910460 dated Jun. 19, 2020.

(Continued)

*Primary Examiner* — Freshteh N Aghdam
(74) *Attorney, Agent, or Firm* — Weide & Miller, Ltd.

(57) ABSTRACT

A system for controlling equalization applied to a received signal comprising an equalizer configured to equalize on a received signal to generate an equalized signal, and a clock recovery module configured to recover a clock signal from the equalized signal or the received signal. A clock adjustment system is configured to receive the clock signal, and at least one control signal, to create a sampling clock signal. A filter is configured to filter the equalized signal to create a filtered signal. A sampling unit samples the filtered signal or the equalized signal such that the output of the sampling unit is provided to a controller. The controller is configured to receive and process the output of the sampling unit to generate a boost signal, and the controller is further configured to provide the boost signal to the equalizer to control the amount of equalization performed by the equalizer.

19 Claims, 9 Drawing Sheets

(56) References Cited

U.S. PATENT DOCUMENTS

| | | |
|---|---|---|
| 5,396,059 A | 3/1995 | Yeates |
| 5,594,748 A | 1/1997 | Jabr |
| 5,812,572 A | 9/1998 | King et al. |
| 6,438,450 B1 * | 8/2002 | DiLorenzo ............. H04H 20/63 |
| | | 348/E7.071 |
| 6,494,370 B1 | 12/2002 | Sanchez |
| 6,556,601 B2 | 4/2003 | Nagata |
| 6,707,492 B1 | 3/2004 | Itani |
| 6,934,479 B2 | 8/2005 | Sakamoto et al. |
| 6,952,531 B2 | 10/2005 | Aronson et al. |
| 7,227,916 B2 | 6/2007 | Ruelke et al. |
| 7,236,108 B2 | 6/2007 | Cheng |
| 7,265,334 B2 | 9/2007 | Draper et al. |
| 7,276,682 B2 | 10/2007 | Draper et al. |
| 7,381,935 B2 | 6/2008 | Sada et al. |
| 7,456,690 B2 | 11/2008 | Kocaman |
| 7,505,498 B2 | 3/2009 | Sanchez |
| 7,701,833 B2 | 4/2010 | Kim |
| 7,734,309 B2 | 6/2010 | Chi et al. |
| 7,949,025 B2 | 5/2011 | Olea |
| 8,213,494 B2 * | 7/2012 | Hidaka ............. H04L 25/03057 |
| | | 375/233 |
| 8,861,578 B1 | 10/2014 | Lusted et al. |
| 8,995,514 B1 | 3/2015 | Asuncion et al. |
| 9,231,803 B2 | 1/2016 | Nishi |
| 9,397,868 B1 | 7/2016 | Hossain et al. |
| 9,559,880 B1 | 1/2017 | Cirit et al. |
| 9,853,735 B1 | 12/2017 | Lin |
| 9,853,839 B2 | 12/2017 | Beukema et al. |
| 9,882,703 B1 * | 1/2018 | Xu ........................ H04L 7/0083 |
| 9,906,232 B1 * | 2/2018 | Cho ........................ H03M 1/40 |
| 10,333,692 B2 * | 6/2019 | Miura ................... H04L 7/0083 |
| 10,404,496 B1 * | 9/2019 | Azenkot ............... H04L 7/0083 |
| 2003/0165168 A1 | 9/2003 | Murata |
| 2004/0188717 A1 | 9/2004 | Ono |
| 2005/0226355 A1 | 10/2005 | Kibune et al. |
| 2006/0098699 A1 | 5/2006 | Sanchez |
| 2006/0126683 A1 | 6/2006 | Kang et al. |
| 2006/0153256 A1 | 7/2006 | Sanchez |
| 2006/0165139 A1 | 7/2006 | Sanchez |
| 2007/0160173 A1 | 7/2007 | Takeuchi |
| 2015/0180642 A1 | 6/2015 | Hsieh et al. |
| 2015/0381393 A1 * | 12/2015 | Kotagiri ............... H04L 25/0292 |
| | | 375/233 |
| 2016/0006589 A1 * | 1/2016 | Kamali ............. H04L 25/03343 |
| | | 375/232 |
| 2016/0352557 A1 * | 12/2016 | Liao .................... H04L 27/3809 |
| 2017/0070370 A1 | 3/2017 | He et al. |
| 2017/0288369 A1 | 10/2017 | Ikram et al. |
| 2018/0159514 A1 | 6/2018 | Zerbe et al. |
| 2020/0195475 A1 * | 6/2020 | Lin ....................... H04L 7/0331 |

FOREIGN PATENT DOCUMENTS

| | | |
|---|---|---|
| KR | 102017014818 | 12/1918 |
| KR | 1020180049784 | 5/1919 |
| KR | 1020050085785 | 8/2005 |
| KR | 1020100061753 | 6/2010 |
| WO | WO 2018/080652 | 5/1918 |
| WO | WO 2008/070138 | 6/2008 |

OTHER PUBLICATIONS

International Search Report issued for Application No. PCT/US2020/055839 dated Jan. 29, 2021.

International Search Report issued for Application No. PCT/US2020/051657 dated Jan. 13, 2021.

International Search Report issued for Application No. PCT/US2020/050919 dated Dec. 23, 2020.

* cited by examiner

Under Equalized

Optimal Equalization

Over Equalized

EQUALIZER ADAPTATION BASED ON EYE MONITOR MEASUREMENTS

1. FIELD OF THE INVENTION

The invention relates to data communications and in particular to a method and apparatus for equalizer control.

2. RELATED ART

Data communication is widespread in modern society as a means to communicate data between remote locations and between data processing systems. Data communication systems enable telecommunications, Internet data, financial transactions, entertainment, and many other applications utilizing data communications. Foundational to data communications is the transmission of data from one location to another. These locations may be in the same data processing system or many kilometers apart.

One challenge for data communication systems, particularly as data transmission rates increase, is to overcome the effects of the channel on the transmitted signal. While a signal with accurate transitions may be transmitted onto the channel upon receipt at a receiver the signal will be affected by the channel such that the transmitted signal is distorted by the channel. With increasing data rates, the channel distortion may be a limiting factor in overall transmit rates and will thus limit the distance the signal may travel, the data rate, and the nature of the signal that may be transmitted.

To address this challenge in the prior art, numerous solutions have been proposed. One such solution is to limit data transit rates and distances. While effective, it is not a suitable solution because it does not improve data transmit rates to keep pace with new technology demands.

Another proposed solution is to utilize advanced systems, such as an equalizer, for processing the received signal. This solution is widely used, but prior art equalizer systems are limited in their ability to correct for channel distortion. There can be many different types of channels to equalize, and the channel can change over time. As a result, the equalizer needs to be trained to find the optimal settings. Furthermore, prior art solutions required numerous hardware elements which increased costs and space consumption.

To overcome the drawbacks of the prior art, an improved method and apparatus are provided for signal equalization and equalizer configuration and control.

SUMMARY

To overcome the drawbacks of the prior art and provide additional benefits, disclosed is a method of adapting equalizer settings. In one embedment, this method of operation processes a received signal with an equalizer to create an equalizer output and low pass filters the equalizer output to generate a low pass filtered signal. The method then processing the equalizer output with a CDR to isolate a clock signal and processes the clock signal with a phase interpolator to generate a sampling clock. Sampling the low pass filtered signal occurs with an analog to digital converter to generate a first sampled equalizer output such that sampling timing is controlled by the sampling clock. Then, providing the first sampled equalizer output to a controller and processing the first sampled equalizer output with the controller to calculate target values. This method also samples the equalizer output with the analog to digital converter based on the sampling clock to generate a second sampled equalizer output. The second sampled equalizer output is provided to the controller which processes the second sampled equalizer output to calculate average signal values. The controller or other device compares the target values with the average values to adjust a boost signal and provides the boost signal to the equalizer. The boost signal controls the amount of equalization applied to the received signal.

In one embodiment, the equalizer is a continuous time linear equalizer. In one configuration, the low pass filtered signal comprises low frequency signal components. This method may occur in a crosspoint switch. In one arrangement, the target values comprise a maximum target value and a minimum target value and the average signal values comprise an average maximum value and an average minimum value. The sampling may occur at a lower data rate than a data rate of the received signal.

Also disclosed is a method of adapting equalizer setting comprising processing a received signal with an equalizer to create an equalizer output and filtering the equalizer output to generate a filtered signal. Then processing the equalizer output with a re-timing module to isolate a clock signal and processing the clock signal to generate a sampling clock. This method also samples the filtered signal to generate a first sampled equalizer output such that sample timing controlled by the sampling clock. The, processing the first sampled equalizer output with the controller to calculate a target value and sample the equalizer output to generate a second sampled equalizer output such that the sampling timing is controlled by the sampling clock. The second sampled equalizer output is processed to calculate an average maximum signal value. This method then compares the target value with the average maximum signal value and based on the comparing, the controller calculates a boost signal. The boost signal is provided to the equalizer to control the amount of equalization applied to the received signal.

In this method of operation, the filter isolates low frequency components in the received signal. The target values may comprise a minimum target value and a maximum target value. It is disclosed that the sampling may occur with an analog to digital converter and the sampling may occur at a lower data rate than a data rate of the received signal. In this embedment, the second sampled equalizer output represents low and high frequency components of the received signal. The sampling clock is created by a phase interpolator.

Also disclosed is a system for controlling the amount of equalization applied to a received signal comprising. In one embodiment, this system includes an equalizer configured to perform equalization on a received signal to generate an equalized signal. A clock recovery module is configured to recover a clock signal from the equalized signal. A clock adjustment system is configured to receive the clock signal and at least one control signal to create a sampling clock signal. A filter is configured to filter the equalized signal to create a filtered signal. A sampling unit is configured to sample the filtered signal or the equalized signal to create a sampled filtered signal and a sampled equalized signal. A controller is configured to receive and process the output of the sampling unit to generate a boost signal. The controller is further configured to provide the boost signal to the equalizer to control the amount of equalization performed by the equalizer.

In one embodiment, the equalizer is a continuous time linear equalizer. In one arrangement, the clock recovery module comprises a clock and data recovery module. It is also disclosed herein that the clock adjustment system may comprise a phase interpolator and a phase detector. The sampling unit may comprise an analog to digital converter. In one embodiment, the filter is a low pass filter. In one configuration, during a first phase of operation the controller receives a sampled filtered signal and during a second phase of operation the controller receives a sampled equalizer output. Sampling by the sampling unit may occur at a lower rate than a data rate of the received signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1A:
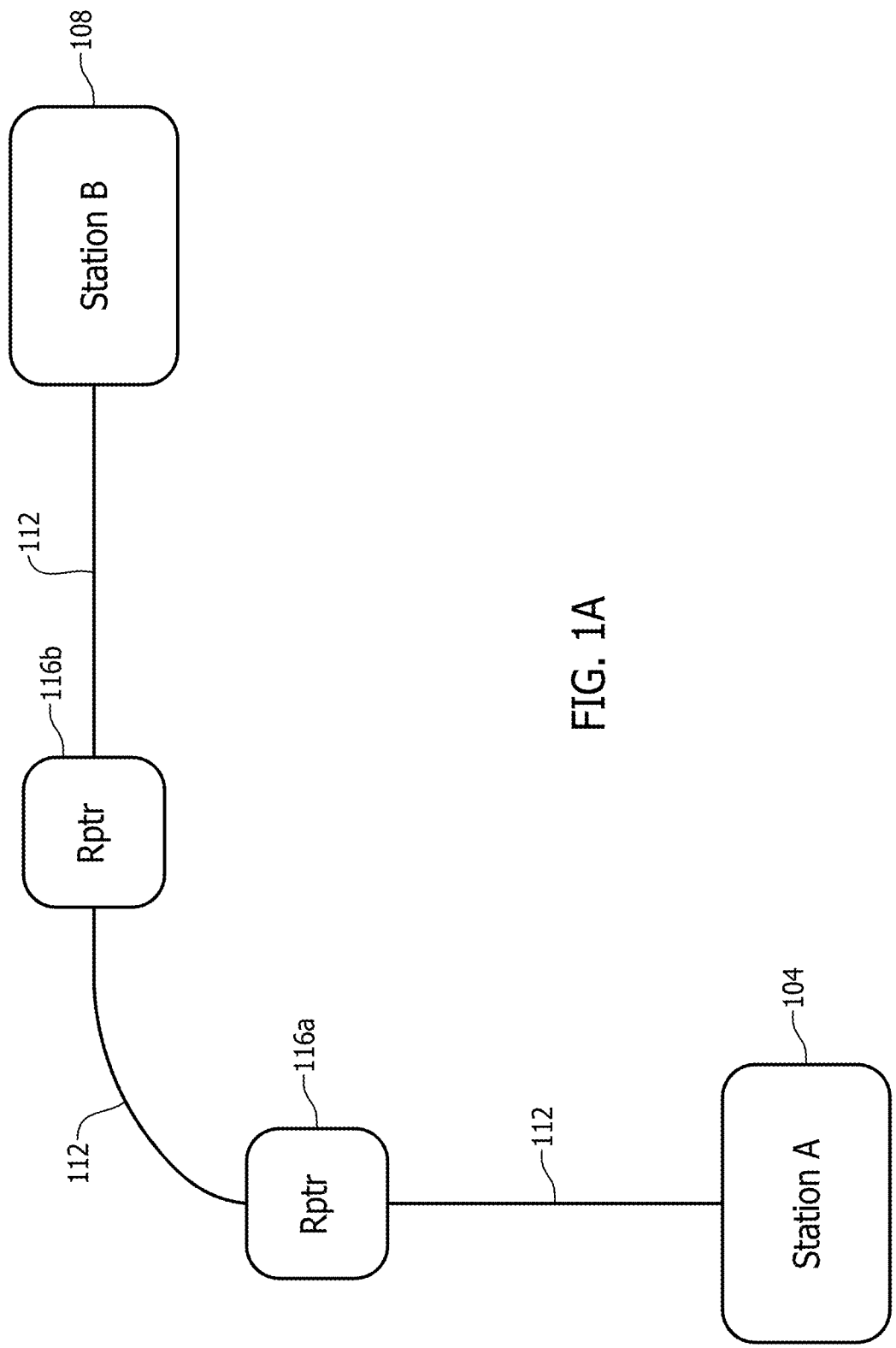
FIG. 1A illustrates a block diagram of an exemplary communication system.

FIG. 1A illustrates an example environment of use of the present invention. In one example embodiment, the method and apparatus disclosed herein is utilized to communicate network data between a first station 104 and second station 108. The network data may travel over any path, conductor or channel 112. The conductor or channel 112 comprising of, but not limited to, one or more metallic conductors, an optical channel, or free space communication such as radio or other frequency communication. If the distance between the first station 104 and the second station 108 is significant, one or more repeaters 116A, 116B may be required to process the signal so that the network data may reach the desired station. As is understood, a repeater may comprise a device that receives a signal and restores or amplifies the signal to a desired format before resending the signal onward. It is also contemplated that there may exist repeaters or stations in addition to those shown, or some systems may be configured without repeaters 116. The term network data comprises data that is exchanged over the network such as customer data, voice data, network data, or computer data. The term system data comprises data that concerns the communication system, such as to control or monitor the communication system or a station.

It is further contemplated that, in addition to network data, it may also be desired to exchange system data between the first station 104 and the second station 108, any of the stations and a repeater, or between repeaters.

Figure 1B:
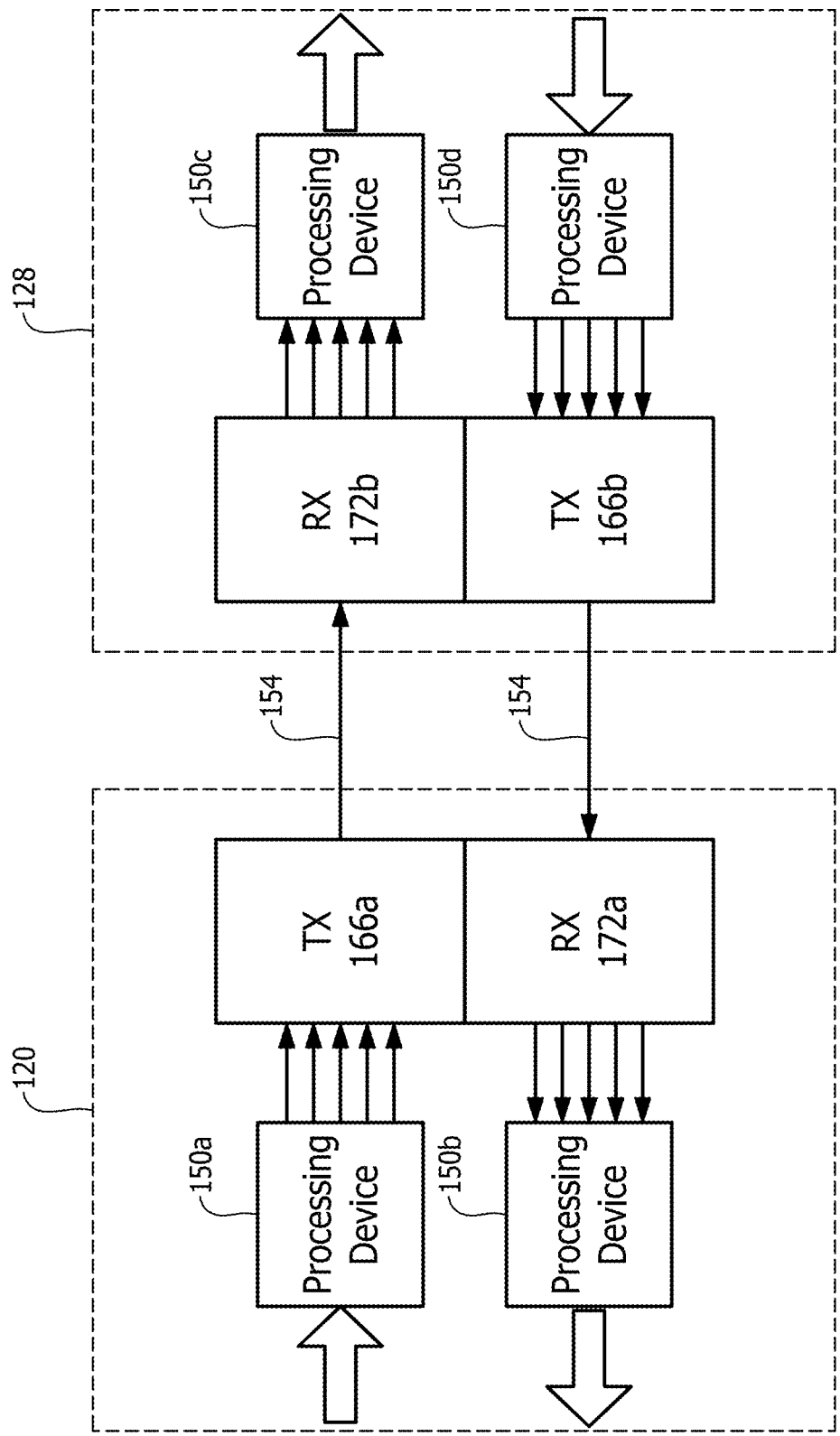
FIG. 1B illustrates a block diagram of an exemplary first environment of use.

FIG. 1B illustrates a block diagram of an example embodiment of a multi-station communication system configured in accordance with the method and apparatus disclosed herein. As shown, a first station 120 is configured to communicate over one or more channels 154 with a second station 128. Each of the first station 120 and the second station 128 may comprise a receiver 172A, 172B and a transmitter 166A, 166B. At least one of the receivers 172A, 172B and transmitters 166A, 166B connect to a processing device 150A, 150B, 150C, 150D as shown. The processing devices 150 may comprise one or more processors, ASIC, control logic, switch fabric, modulator, demodulator, inverters, multiplexers, buffers, or any other device. Input to the processing devices 1500 may occur in any manner known in the art. Similarly, although certain paths or interfaces are shown as either serial or parallel, it is fully contemplated that any of these paths may be configured as either serial or parallel paths, or both.

Figure 1C:
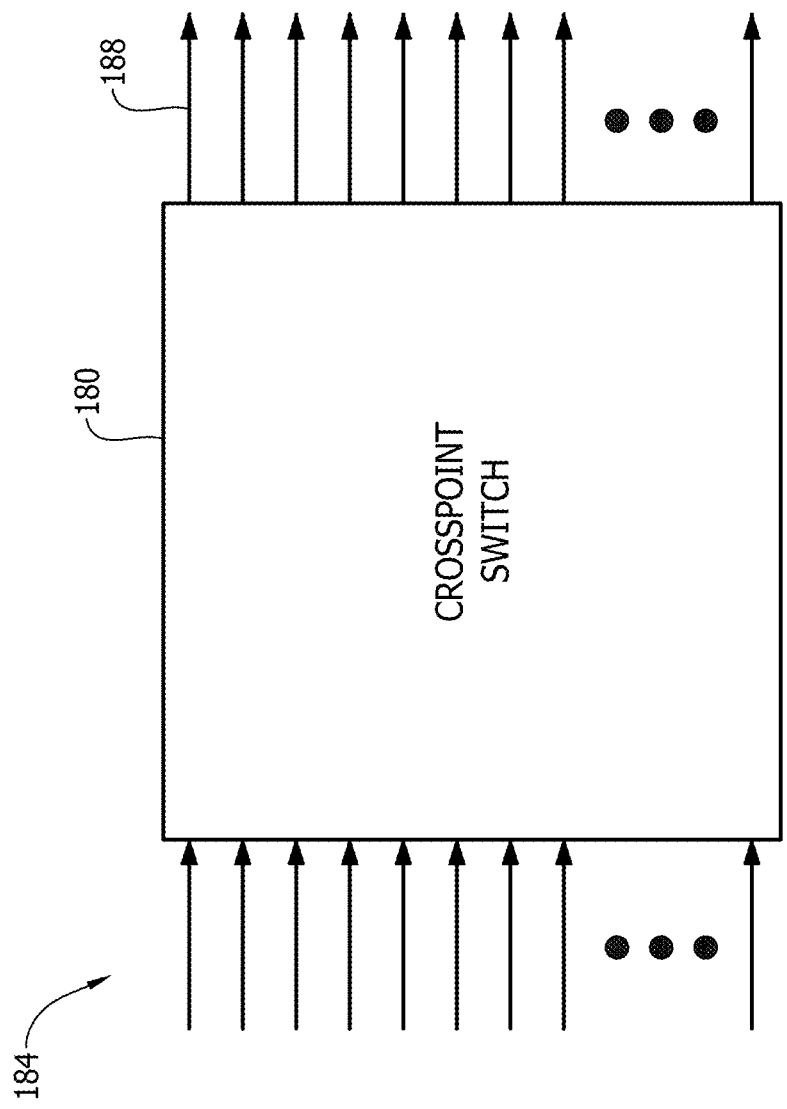
FIG. 1C illustrates a block diagram of an exemplary second environment of use.

FIG. 1C illustrates an example embodiment of an example environment of use. In this embodiment, the innovation disclosed herein may be configured as part of a crosspoint switch 180 having a plurality of inputs 184 and a plurality of outputs 188. A crosspoint switch 180 is a collection of switches arranged in a matrix configuration. Any number of inputs 184 and outputs 188 may be provided. In one embodiment, the crosspoint switch has 288 inputs and 288 outputs (channels) and all channels or fed power form a shared power supply node. In a crosspoint switch 180 the multiple input and output lines form a crossed pattern of interconnecting lines between which a connection may be established by closing a switch or other connection located at each intersection.

Although shown in these example environments of use, it is contemplated that any system may benefit from the method and apparatus disclosed herein. In one configuration, any system with a clock and data recovery module or function will benefit from this innovation. Similarly, any system that receives and re-times data may benefit either prior to processing or as part of a re-transmission.

Figure 2A:
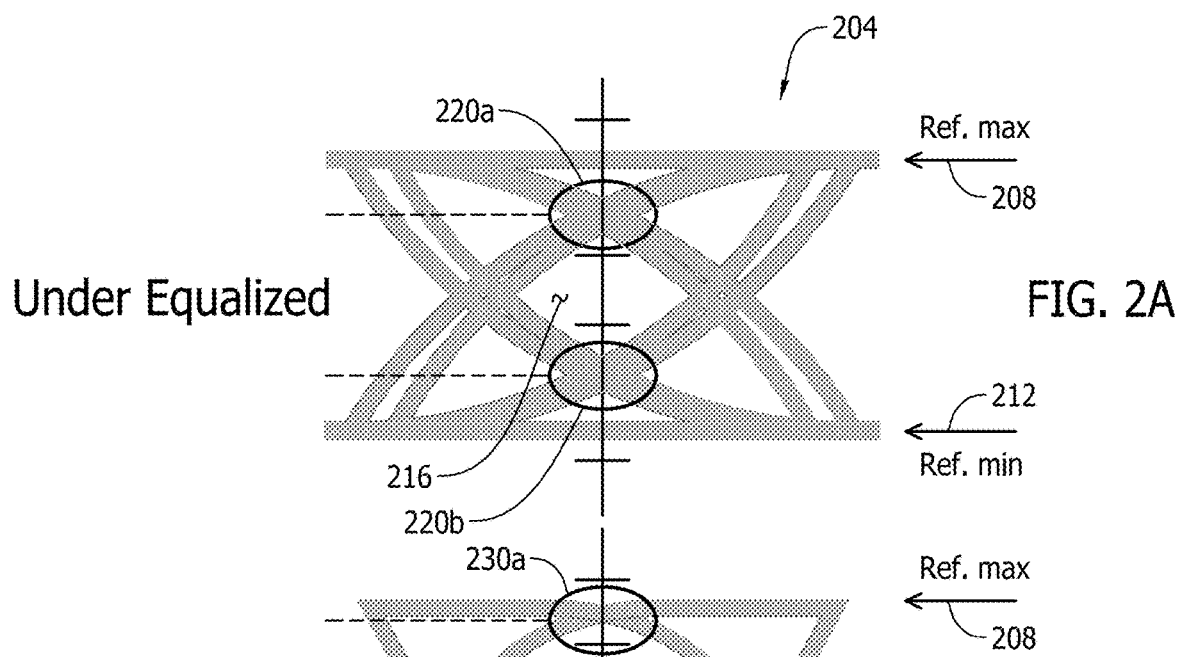
FIG. 2A illustrates an eye diagram plot of an under equalized signal.

FIG. 2A illustrates an eye diagram plot of an under equalized signal. In this example embodiment, the signal plot 204 for what is traditionally known in the art as an eye diagram. An inner area of the eye 216 is preferred to be open and free from the signal. As is understood in the art, if the eye 216 of the eye diagram closes (becomes small), as in FIG. 2A, then it is difficult to accurately recover the received signal and the bit error rate will increase. Also shown in FIG. 2A, is a maximum reference level 208 and a minimum reference level 212. These are the preferred minimum and maximum signal values for an equalized signal. In FIG. 2A, the signals in areas 220A, 220B are under equalized due to the value of signals 220A being less than the maximum reference level 208 and the signals 220B being greater than the minimum reference levels 212. As a result, this is not an optimal equalization level, which in turn causes the eye 216 to collapse.

Figure 2B:
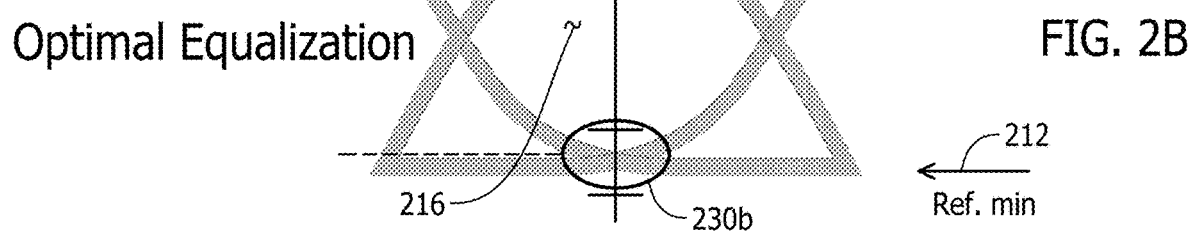
FIG. 2B illustrates an eye diagram plot of a properly equalized signal.

FIG. 2B illustrates an eye diagram plot of a properly equalized signal. An inner area of the eye 216 is preferred to be open and free from the signal as is shown in FIG. 2B. The maximum reference level 208 and a minimum reference level 212 are the same as in FIG. 2A. These are the preferred minimum and maximum signal values for an equalized signal. In FIG. 2B, the signals in areas 220A, 220B are properly equalized due to the value of signals 230A being generally the same amplitude, over time, as the maximum reference level 208 and the signals 230B being generally the same amplitude, over time, as the minimum reference levels 212. As a result, this is an optimized equalization level, which in turn causes the eye 216 to be open allowing for accurate sampling.

Figure 2C:
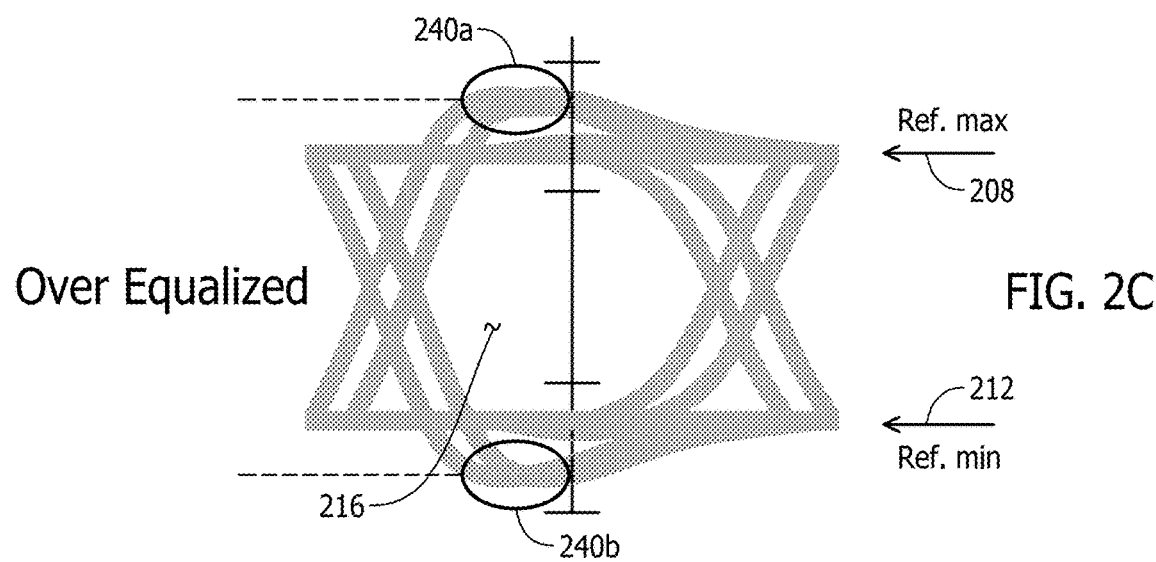
FIG. 2C illustrates an eye diagram plot of an over equalized signal.

FIG. 2C illustrates an eye diagram plot of an over equalized signal. In this example embodiment, the signal plot 204 is of an eye diagram. An inner area of the eye 216 is preferred to be open (wide as well as tall) and free from the signal. As is understood in the art, if the eye 216 of the eye diagram closes, such as becoming to narrow as is starting to occur in FIG. 2C then it is difficult to accurately recover the received signal and the bit error rate will increase. Also shown in FIG. 2C, are a maximum reference level 208 and a minimum reference level 212. These are the preferred minimum and maximum signal values for an equalized signal. In FIG. 2A, the signals in areas 240A, 240B are over equalized due to the value of signals 240A being greater than the maximum reference level 208 and the signals 240B being less than the minimum reference levels 212. As a result, this is not an optimal equalization level, which in turn causes the eye 216 to collapse.

Figure 3:
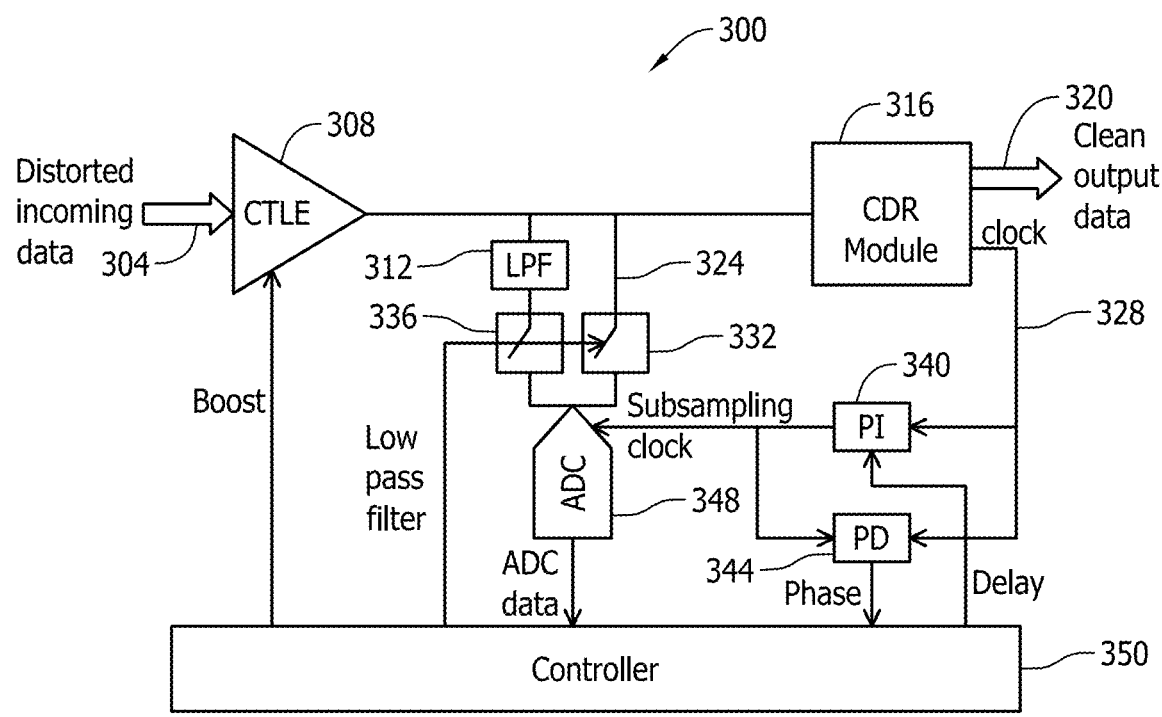
FIG. 3 illustrates a block diagram of an example embodiment of an equalizer control system.

FIG. 3 illustrates a block diagram of an example embodiment of an equalizer control system. This is but one possible configuration and it is understood that one of ordinary skill in the art may arrive at other embodiments without departing from the claims that follow. A discussion of the layout of this embodiment is discussed along with a brief description of each element followed by a discussion of the operation of the overall system for equalizer control.

The equalizer control system 300 includes an input 304 configured to receive incoming data, which may be distorted after passage through the channel. The channel may comprise any type conductor including a wired, free space, or optic channel. The channel may be a bus, backplane, or a channel between remote locations. The signal may also be received from an analog front-end system. Even though the signal is digital, it is treated as an analog signal due to the distortion by the channel.

The distorted incoming data on input 304 feeds into a CTLE (continuous time linear equalizer) 308 configured to perform equalization on the signal. Although shown in FIG. 3 as a CTLE, it is disclosed that any type equalizer, filter or other processing device may be used to reduce channel distortion. In one embodiment, the CTLE 308 performs an inverse Fourier transform of the channel such that it reverses the effects of the channel, in an effort to create the transmitted signal. As is understood in the art, the channel may affect different frequencies differently and as a result, the equalization may be frequency dependent.

The output of the CTLE 308 feeds into a CDR (clock data recovery) module 316, a low pass filter (LPF) 312, and a second switch 332 via path 324. The CDR 316 processes the signal to create re-timed and 'cleaned' data with accurate transition as well a clock signal. In one embodiment, the CDR 316 functions as a jitter cleaner. The re-timed data is provided on output 320 while the clock signal is presented on path 328. CDR operation is well known in the art and as such is not described in detail herein. The CDR output 320 may connect to an external system. In the example environment of a crosspoint switch, the CDR output goes to a crosspoint matrix or switch. Alternatively, the CDR output may be sent to an output driver or could feed into a crosspoint switch. It is also contemplated that the environment of use could be a single channel system, multi-channel environment, or an optic module.

The output of the low pass filter (LPF) 312 is provided to a first switch 336. The output of the first switch 336 and the second switch 333 feeds into an ADC (analog to digital converter) 348. The low pass filter 312 filters the output of the equalizer 312 to pass low frequency (spectrum) signal content to the ADC 348 to obtain envelope information (target information).

The clock signal is provided to a phase interpolator (PI) 340 and a phase detector (PD) 344. The phase interpolator 340 is a device configured to process a clock signal and, responsive to a control signal, adjust the phase or timing of the clock signal in very precise increments. The output of the phase interpolator 340 is a clock signal (sampling clock) with adjusted phase and which also may be subsampled to a lower rate. The output of the phase interpolator 340 is routed to the ADC 348 to serve as a subsampling clock and to the phase detector 344 to provide an adjusted or corrected clock signal to the phase detector. The phase detector 344 is configured to align the subsampling clock with the CDR clock signal which, in this embodiment, is centered in the eye of the incoming signal.

The phase detector 344 generates an error or difference signal representing the difference between the clock signal from the CDR module 316 and the output of the phase interpolator 340. The output of the phase detector 344 feeds into a controller 350. The controller 350 also receives a digital signal from the ADC 348. The ADC 348 converts an analog input to a digital signal. In this embodiment, the controller 350 generate three outputs. A delay signal is provided to the phase interpolator 340. A switch control signal is provided to the first switch 336 and the second switch 332. A boost signal is provided from the controller 350 to the CTLE 304. Increasing the boost signal increases the amount of equalization. Decreasing the boost signals decreases the amount of equalization applied to the incoming data signal. The controller 350 may be any device or system configured to perform as described herein. This may include, but is not limited to, a state machine, assembly of logic elements, a processor/memory configured to process or execute non-transitory machine executable instructions stored on a memory, an ASIC, a DSP, or any other device capable of performing as described herein.

In this embodiment, the boost signal controls the amount of equalization applied to the incoming data signal. In general, it may be considered as doing two things. First, in the frequency domain the boost signal has an impact on amplitude and compensates for the phase distortion of the channel. The equalizer settings and operation maintain the group delay flat to reduce distortion between the high frequency and low frequency signal components (two types of energy). This insures the different frequency components are aligned in time to, for example, arrive at the same time. This functions to maintain an open eye and prevent significant offset between frequencies. The equalizer settings are trained, over time. In the past this may have required dedicated hardware, filters, and integrators to form the feedback loop, which are not required in this embodiment.

The controller 350 provide the delay signal to the phase interpolator 340 to control the amount of offset introduced into the subsampling clock signal. The switch control signal provided by the controller 350 to the first and second switches 336, 332 controls operation of the switches as described below to selectively route, either the output of the equalizer 308 or the output of the low pass filter 312, to the ADC 348. The boost signal to the equalizer 308 controls the amount of the equalization provided to the incoming data to obtain optimized equalization as shown in FIG. 2B. The boost signal may be any type signal or value. In one embodiment, the boost signal is a 6-bit signal providing 0 to 63 different unique control levels.

Although not shown as a separate element, the combination of the phase interpolator, the ADC, and the path to provide the CTLE output directly to the ADC are the elements that function as an eye monitor. In this embodiment it is an open loop. The eye monitor is capable of analyzing the eye of the plot resulting from the signal output from the CTLE 308 based on the output of the ADC 348. In this embodiment the phase interpolator 340 and the ADC 348 operate to provide a signal to the controller 350 to obtain eye monitor data. This hardware can be configured to function as an eye monitor. To form the eye, for monitoring, this example embodiment changes the phase of the signal and the ADC 348 converts the equalized signal to digital bits, accumulates samples, changes the phase, and reconstructs an eye as shown. By monitoring the eye, it provides visibility in to the node at the location between he CTLE and the CDR. From the eye information at this node how much margin the signal has can be determined. That is an eye monitor feature. The present innovation re-uses existing hardware that is already present in the system to train the CTLE 308. This provides the cost and space reduction benefits of not adding hardware except for the low pass filter 312 and the phase detector 344 which centers the phase in the center of the eye.

In operation, a distorted data signal is provided to the equalizer 308. Due to the changing nature of the channel, interferers that may affect the channel, changes in the receiver over time and temperature, and numerous other factors, the channel distorts the incoming data as compared to the transmitted signal. The type and amount of distortion may change over time. As a result, the equalizer compensates for the distortion to reverse the effects of the channel, to the extent possible. Due to the changing nature of the channel, it is beneficial to adjust, update, or adapt the equalizer setting over time. To update the equalizer, the controller generates a boost signal which controls the equalizer settings, and in turn changes the amount of equalization applied to the incoming data.

The process of generating the boost signal may be best described as multiple sub-steps. The first step is to determine target levels for the equalized signal. As shown in FIG. 2B, the target levels may comprise a reference maximum level and reference minimum level. The second step is to compare the equalizer output to the target levels.

The third step is to adjust the boost signal to the equalizer such that the equalizer output is at or near the target values. The goal of the boost signal is to establish the equalizer output to the target levels.

Clock & Data Recovery and Generation of Subsampling Clock

The following is a discussion of steps of operation for clock and data recovery as well as generation of the subsampling clock. The incoming signal is equalized by the equalizer and the equalizer output is provided to the CDR. It may take time for the CDR to lock onto the data and provide a synchronous clock. The CDR retimes the data, which is provided as an output and recovers the clock signal. The phase interpolator 340 and phase detector receives the CDR clock output.

The phase interpolator 340 processes the clock signal and a delay control signal from the controller to create the subsampling clock signal that is provided to the ADC 348. The phase interpolator 340, upon receipt of the clock signal from the CDR 316, varies the timing or phase of the clock signal to form an adjusted output clock, referred to herein as a subsampling clock. In one embodiment, the phase interpolator functions as a programmable delay and it is programmed such that the ADC 348, which receives the subsampling clock, will sample the CTLE output in the center of the eye (i.e., at a desired time in the signal). In other embodiment, other sampling times are possible. The controller 350 provides the delay control signal to the phase interpolator 340 to control how much delay the phase interpolator will introduce into the subsampling clock. The phase detector 344 aligns the subsampling clock with the CDR clock, in this embodiment, to be in the center of the eye.

The ADC 348 then uses the subsampling clock signal from the phase interpolator 340 to control when it samples the output of the CTLE 308. The ADC 348 then samples the equalizer output at the sampling times. In one embodiment, the ADC output has 7 bits of resolution. This clock recovery and subsampling clock signal generation occur during operation and during the other steps and is described separately for clarity.

In general, the steps may thus be outlined as first programming the phase interpolator to center the sampling clock to the center of the eye. Then, low pass filtering the equalizer output to obtain the minimum and maximum target levels. This occurs in the controller 350. Then, working with the full bandwidth equalizer output, the controller compares the amplitude of the full spectrum equalizer output to the target values. Based on the comparison, the controller adjusts the boost level to align the amplitude of the full bandwidth signal to the target values. Each step is discussed in great detail below.

Determining Target Levels for the Equalized Signal

In a first phase of operation, the goal is to determine the target levels for the equalized signal. This occurs by the controller 350 providing a switch control signal to the first and second switch 336, 332. The switch control signal closes the first switch 336 and opens the second switch 332. This connects the low pass filter output to the ADC 348. The incoming data is presented to and processed by the equalizer 308 to generate an equalizer output. The low pass filter processes the equalizer output to generate a waveform that has minimum and maximum target values over time, typically by passing the low frequency components of the equalizer output to the ADC 348. The minimum and maximum target values may be referred to as the envelope of the low pass signal. This low pass filtered waveform is digitated by the ADC and provided to the controller. The controller 350 extracts the maximum and minimum values from the digitized waveform (which represents low frequency spectrum of the equalizer output) to effectively establish the envelope of the signal. This envelope is used as the target values, namely the minimum reference level and the maximum reference level. During subsequent steps, the target values (minimum reference level and the maximum reference level) are used during boost value control. During this initial stage of operation, the boost setting may be too high or too low for channel conditions because at this stage the channel conditions are unknown. The low pass filtering removes the effects of equalization, which may be too high and undesirably increasing the amplitude of high frequency signal. Therefore, the low pass filtering removes what may be overly enhanced high frequency signals, thereby yielding an accurate logic 1 value and a logic 0 level. If the equalizer output were not low pass filtered the target values may be inaccurate due to an overly boosted equalizer output for the channel.

Comparing the Equalizer Output to the Target Levels

The next phase of operation has the controller 350 sending a switch control signal to the first switch 336 and the second switch 332 to open the first switch and close the second switch. This has the effect of providing the CTLE output directly to the ADC 348. This provides the full spectrum (high and low frequency components) to the ADC 348. The ADC output is processed by the controller to generate and average logic 1 level and an average logic zero levels. To generate the average level, the signals (logic 1 levels) are collected over time and then averaged. The same process occurs for the logic 0 levels.

As a result, the controller 350 processes ADC 348 to measuring the average value of the logic 1 values and adjusts the equalizer output for the average logic 1 levels to be at the maximum target value which were calculated in the prior step. This can be adjusted by adjusting the boost values. Likewise, the controller 350 processes ADC 348 to measuring the average value of the logic 0 values and adjusts the equalizer output for the average logic 0 levels to be at the minimum target value which were calculated in the prior step. This can be adjusted by adjusting the boost values.

During this phase of operation, the envelope signal levels (target values) are not changing. If there is under equalized eye, it will appear as the eye shown as in FIG. 2A. As such, the received signal bits have attenuation and as a result, the eye is closing. In this configuration, the eye monitor generates a signal value distribution with an average data value that has a lower value than the target value. The target value is at a saturated level. The controller detects when the equalizer output is under equalized or over equalized by comparing the target values which were previously determined to the equalized signal. A comparator or control logic of the controller may make this determination.

Adjusting the Boost Signal

Based on a comparison between the full spectrum equalizer output (not using the low pass filter 312) and the target values (calculated using the low pass filter), the controller 350 will adjust the boost to establish an optimized equalized eye. In one embodiment this comprises adjusting the boost value so that the average value of the CTLE output logic one value is equal to the maximum target value, which is the maximum value of the low pass filtered version of the CTLE output. If the comparison determines that the output of the equalizer is over equalized, namely the average value of logic 1 data is higher than the target collected in the first step, then the controller lowers the boost value so the average value approaches or is at the target level. If the comparison determines that the output of the equalizer is under equalized, namely the average value of logic 1 data is lower than the target collected in the first step, then the controller increases the boost value so that the average value is at the target level. Averaging or other filtering may occur to control the rate of change of the boost signal.

In one embodiment, the target values are evaluated periodically during operation and the boost value is also updated. Thus, the values are re-calculated, and the boost adjusted. This may occur at any time, based on changing channel conditions, at startup, or at predetermined times.

It is also contemplated that the ADC 348, the phase interpolator 340, and the controller 350 may not be running at full speed. For example, if the incoming data is received at 28 Gbits per second, then the ADC and the phase interpolator may be down sampled 256 times resulting a sample occurring once every 256 bits of data. This reduces power consumption and complexity. An integrated divider may be used to down sample the signal and run these elements at a lower data rate. In other embodiments, different amounts of down sampling may occur.

Figure 4A:
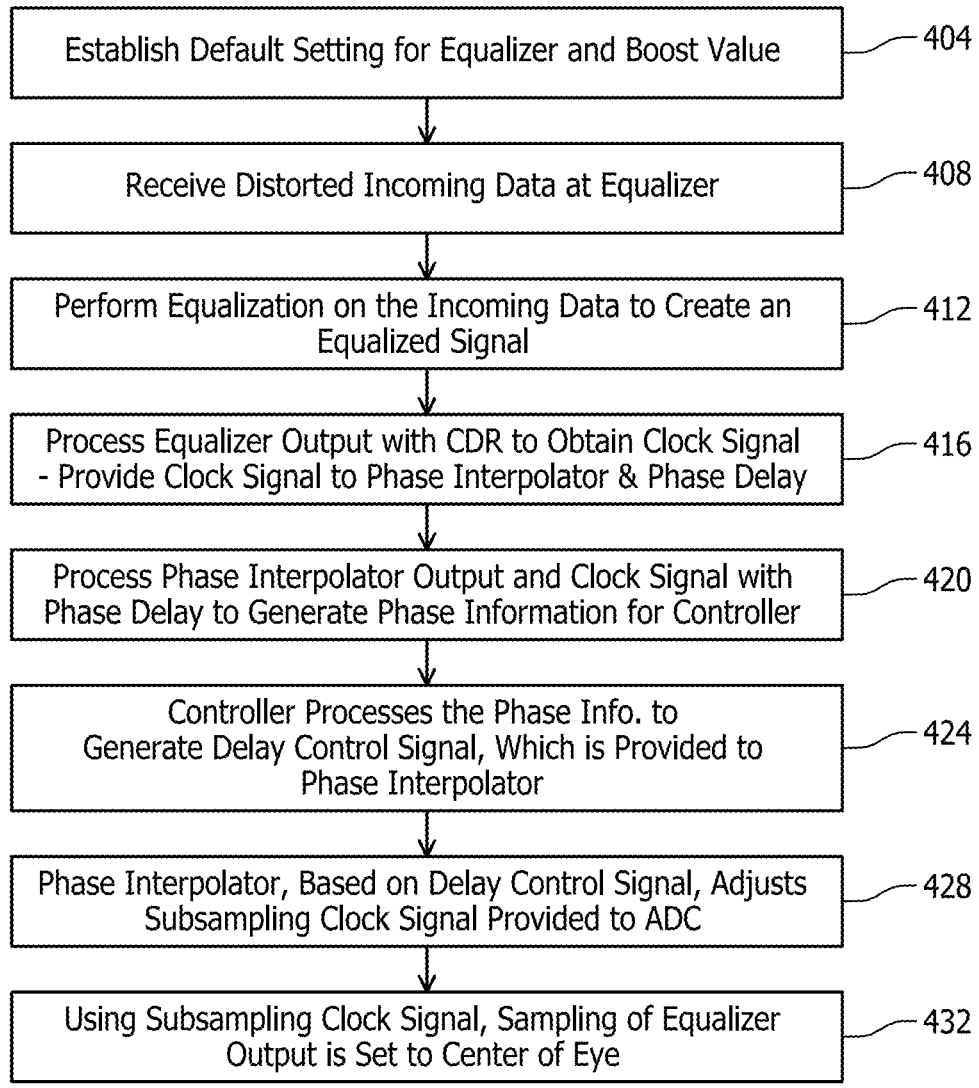
FIG. 4A and FIG. 4B illustrate an example method of operation.
Figure 4B:
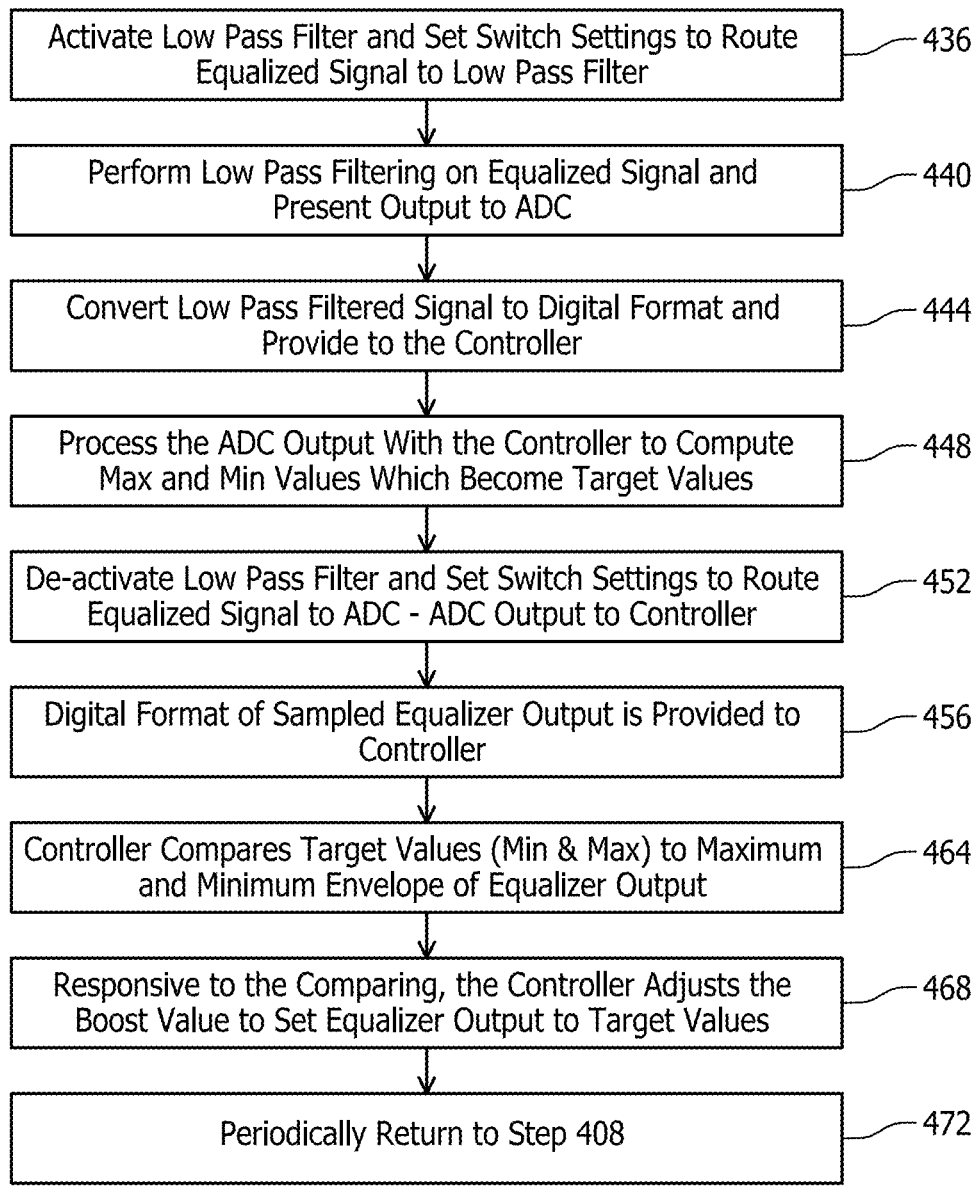

FIGS. 4A and 4B illustrate an example method of operation. This is one example method of operation, and it is contemplated that other methods of operation may be created without departing from the claims that follow.

At a step 440, the equalizer or controller establish default settings for the equalizer and the boost values. These values may be programmed into the controller or the equalizer may be based on prior settings for the channel. At a step 408, the equalizer receives the incoming distorted data stream. As discussed above, this data may be retrieved from any number of difference sources, such that the data is distorted by the channel.

Next, at a step 412 the equalizer performs equalization on the received data to create an equalized signal. At this stage, the level of equalization may not be ideal or be adapted to nature of the channel. At a step 416, the CDR processes the equalizer output to obtain or recover the clock signal from the equalized signal and then, the clock signal is provided to the phase interpolator and the phase detector. The CDR is also outputting the re-timed data from the CDR on an output to subsequent processing elements or other devices.

At a step 420, the phase interpolator output is provided to the phase detector. The phase detector also receives the clock signal. The phase detector generates phase information for the controller to align the subsampling clock (from the phase interpolator) with the CDR clock, which is, in this embodiment, centered in the eye of the incoming eye. The phase information, that is provided to the controller, may include phase information to defines whether the sampling clock is early or late compared to the CDR clock. The controller adjusts the delay provided to the phase interpolator to adjust the subsampling clock. At a step 424, the controller processes the phase information to generate a delay control signal, which is provided to the phase interpolator.

At step 428, the phase interpolator, based on the delay control signal, adjusts the subsampling clock signal provided to the ADC. In one embodiment, the sub sampling clock centers the sampling time at the center of the eye. In other embodiments, the sampling time may be advanced or delayed with respect to the center of the eye.

At a step 432, using the sampling clock provided to the ADC, the sampling time is set to the center of the eye and the ADC output is provided to the controller at a step 436.

At a step 436 the low pass filter is activated, and a control signal is provided to the first switch and the second switch to route the equalized signal to the low pass filters. This phase of operation uses and analyzes the low frequency components of the equalized signal to create target values. At a step 440, the low pass filter performs filtering on the equalized signal and presents the low pass filtered signal to the analog to digital converter (ADC).

Next, at a step 444, the ADC converts the equalized signal to a digital format, which is provided to the controller. Sampling times of the ADC are controlled by the subsampling clock as generated by the phase interpolator. In one embodiment, the subsampling clock controls the ADC to sample at a lower rate than the data rate of the equalized signal and the sampling time is in the center of the eye formed by the equalized signal.

At a step 448 the digital signal from the ADC is processed by the controller to compute max and min values for the signal, which become the target values (maximum target value and minimum target value). The output of the low pass filter is the lower frequency signal content and as such the envelope information for maximum and minimum values is based on the lower frequency content of the equalized signal. This removes the high frequency content, which may be over equalized by the equalizer due to the equalizer, at this stage or phase of operation, using in accurate boost levels. The target values are stored, such as in a memory or register, and are used in later phases of the process to compare the full spectrum equalizer output minimum and maximum signal values to the target values which were based on low frequency signal. During this phase of operation, the subsampling clock is generated as described below.

At a step 452, the system de-activates the low pass filter and controls the switch settings to route the equalized signal (full spectrum) to the ADC, and the ADC output of the digitized signal is provided to the controller at a step 456. Then, at a step 464, the controller compares the average of the positive samples to the maximum target value and compares the average of the negative samples to the minimum target value.

At a step 468, responsive to the comparing, the controller adjusts the boost value to set the average logic levels for 1 and 0 values (full spectrum) to be generally at the target values. Thus, average logic 1 level is set to the maximum target value and the average logic 0 level is set to the minimum target value. At a step 472 the operation returns to step 408 and this process repeats itself periodically, at pre-determined times, or in response to changing channel conditions.

Figure 5:
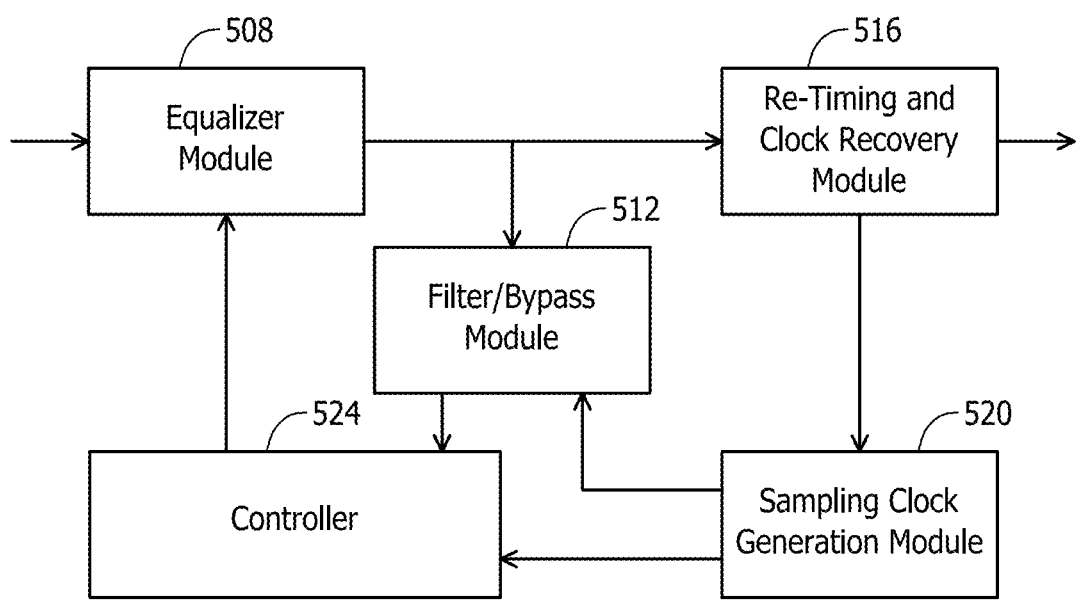
FIG. 5 illustrates a block diagram of an exemplary alternative embodiment.

FIG. 5 illustrates a block diagram of an exemplary alternative embodiment. As shown an equalizer 508 receives the incoming data and performs equalization based on the equalizer settings, at least some of which are controlled by a boost value from a controller 524. The equalized signal is provided to a filter/bypass module 512 and a re-timing and clock recovery module 516. The re-timing and clock recovery module 516 adjusts the phase of the clock signal to generate a sampling clock which is provided to the filter/bypass module 512.

Based on the sampling clock, during a first phase of operation, the filter/bypass module 512 samples the signal to obtain amplitude information from a low frequency spectrum of the equalized signal. The resulting information is provided to the controller 524. The controller generates minimum and maximum target values for the low frequency spectrum of the equalized signal.

During a second phase of operation, the equalizer output is provided to the filter/bypass module 512. The filter/bypass module 512 does not perform filtering on the signal and instead presents the full spectrum equalizer output to the controller. Sample timing of the bypass module or controller is determined by the sampling clock from the sampling clock generation module 520.

The controller 524 processes the full spectrum equalizer output to determine amplitude information for the equalizer output. The amplitude information is compared to the target values collected from the low frequency spectrum components. Based on the comparison, the boost value may change to increase or decrease equalization which in turn forces the amplitude full spectrum equalizer output to approach the target values.

Figure 6:
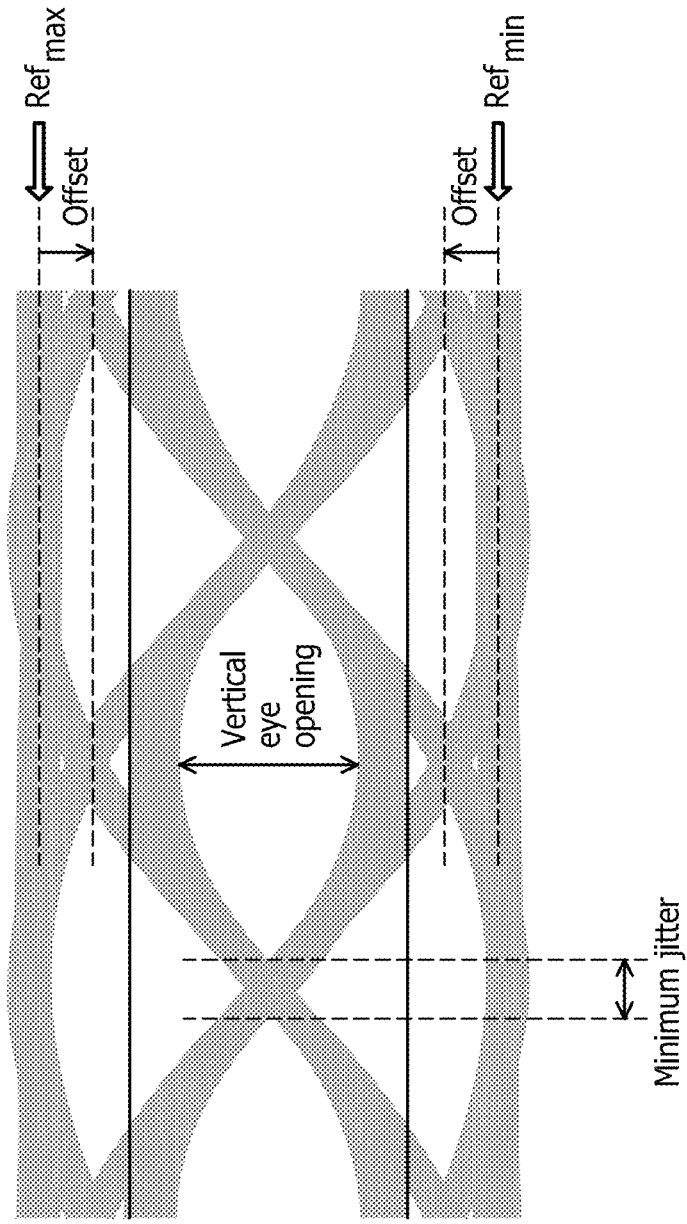
FIG. 6 illustrates an exemplary eye diagram plot showing offset.

In one embodiment an offset to the subsampling signal is introduced so that the target levels are one step above (over equalized) or one step below (under equalized) the envelope levels detected when the low pass filtered signal was processed. To get the best eye or signal to present to the CDR for timing recovery, it may not always be the most desirable to maximize the vertical opening of the eye. For example, a factor that can be important is timing jitter, which is the variance or distribution of the zero crossing of the transition. It is preferred to have the distribution (timing jitter) as low as possible to provide maximum amount of time to sample the signal. The optimized equalization plot of FIG. 2B satisfies this criteria. It has a maximum eye opening and also has best horizontal eye opening, but this is often not the case. It is disclosed herein have an under equalized eye to have the optimal horizontal eye opening. FIG. 6 illustrates a signal plot showing the vertical eye opening, the minimum jitter, and offset to the reference maximum value and the reference minimum value. The vertical eye opening may be reduced to minimize the timing jitter.

The method disclosed herein will provide an optimized eye, but the resulting plot may not have an optimal horizontal eye opening. To have the system converge to an optimal eye opening (horizontal and vertical), it can be made to converge to an under equalized eye. This can be done by using the maximum target value but subtracting an offset from the maximum target value. This will yield a slightly under equalized signal, but it will have improved horizontal eye opening. This will force the distribution to be as long or wide as possible so the system will have time to accurately sample. The offset may be positive or negative. Thus, to have the loop converge to an under equalized state, an offset may be added or subtracted from the maximum target value and/or the minimum target value. In implementing the offset values may be dependent on the boost applied to obtain the maximum horizontal eye openings.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:
1. A method of adapting equalizer settings comprising:
processing a received signal with an equalizer to create an equalizer output;
low pass filtering the equalizer output to generate a low pass filtered signal;
processing the equalizer output to isolate a clock signal;
processing the clock signal with a phase interpolator to generate a sampling clock;
sampling the low pass filtered signal with an analog to digital converter to generate a first sampled equalizer output, the sampling timing controlled by the sampling clock;
providing the first sampled equalizer output to a controller;
processing the first sampled equalizer output with the controller to calculate target values;
sampling the equalizer output with the analog to digital converter based on the sampling clock to generate a second sampled equalizer output;
providing the second sampled equalizer output to the controller;
processing the second sampled equalizer output with the controller to calculate average signal values;
comparing the target values with the average values to adjust a boost signal; and providing the boost signal to the equalizer, the boost signal controlling an amount of equalization applied to the received signal.

2. The method of claim 1 wherein the equalizer is a continuous time linear equalizer.

3. The method of claim 1 wherein the low pass filtered signal comprises low frequency signal components.

4. The method of claim 1 wherein the method occurs in a crosspoint switch.

5. The method of claim 1 wherein the target values comprise a maximum target value and a minimum target value and the average signal values comprise an average maximum value and an average minimum value.

6. The method of claim 1 wherein the sampling occurs at a lower data rate than a data rate of the received signal.

7. A method of adapting equalizer setting comprising:
processing a received signal with an equalizer to create an equalizer output;
filtering the equalizer output to generate a filtered signal;
processing the equalizer output with a re-timing module to isolate a clock signal;
processing the clock signal to generate a sampling clock;
sampling the filtered signal to generate a first sampled equalizer output, the sample timing controlled by the sampling clock;
processing the first sampled equalizer output with the controller to calculate a target value;
sampling the equalizer output to generate a second sampled equalizer output, the sampling timing controlled by the sampling clock, wherein the first sampled equalizer output is different from the second sampled equalizer output;
processing the second sampled equalizer output to calculate an average maximum signal value;
comparing the target value with the average maximum signal value;
based on the comparing, calculating a boost signal; and
providing the boost signal to the equalizer to control an amount of equalization applied to the received signal.

8. The method of claim 7 wherein the filter isolates low frequency components in the received signal.

9. The method of claim 7 wherein the target values comprise a minimum target value and a maximum target value.

10. The method of claim 7 wherein the sampling occurs with an analog to digital converter and the sampling occurs at a lower data rate than a data rate of the received signal.

11. The method of claim 7 wherein the second sampled equalizer output represents low and high frequency components of the received signal.

12. The method of claim 7 wherein sampling clock is created by a phase interpolator.

13. A system for controlling an amount of equalization applied to a received signal comprising:
an equalizer configured to perform equalization on a received signal to generate an equalized signal;
a clock adjustment system configured to receive a recovered clock signal from the equalized signal and at least one control signal and create a sampling clock signal;
a filter configured to filter the equalized signal to create a filtered signal;
a sampling unit configured to sample the filtered signal or the equalized signal to create a sampled filtered signal and a sampled equalized signal;
a controller configured to receive and processes the output of the sampling unit to generate a boost signal, the controller further configured to provide the boost signal to the equalizer to control the amount of equalization performed by the equalizer.

14. The system of claim 13 wherein the equalizer comprises a continuous time linear equalizer.

15. The system of claim 13 wherein the clock adjustment system comprises a phase interpolator and a phase detector.

16. The system of claim 13 wherein the sampling unit comprises an analog to digital converter.

17. The system of claim 13 wherein the filter is a low pass filter.

18. The system of claim 13 wherein during a first phase of operation the controller receives a sampled filtered signal and during a second phase of operation the controller receives a sampled equalizer output.

19. The system of claim 13 wherein the sampling by the sampling unit occurs at a lower rate than a data rate of the received signal.

* * * * *